Dec. 6, 1966    G. A. DEAN    3,289,860
SYSTEM FOR HANDLING STACKED SHEETS
Filed June 9, 1964    4 Sheets-Sheet 1
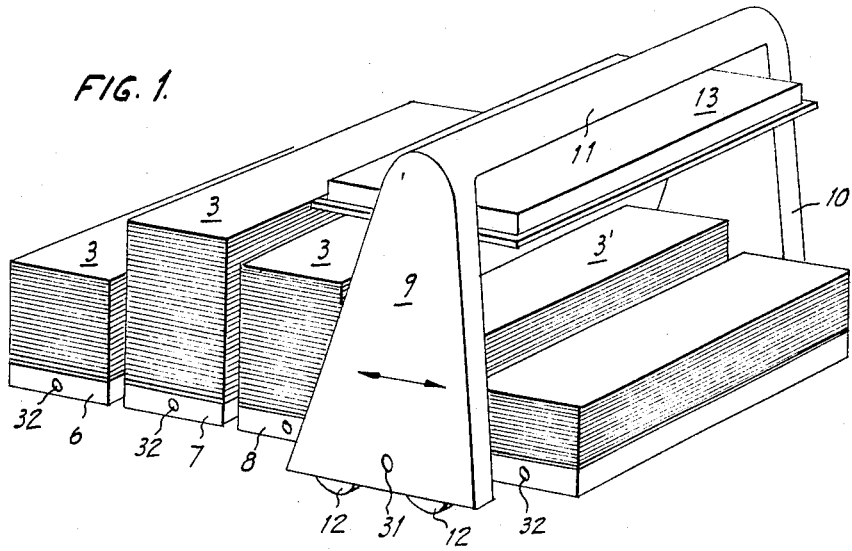
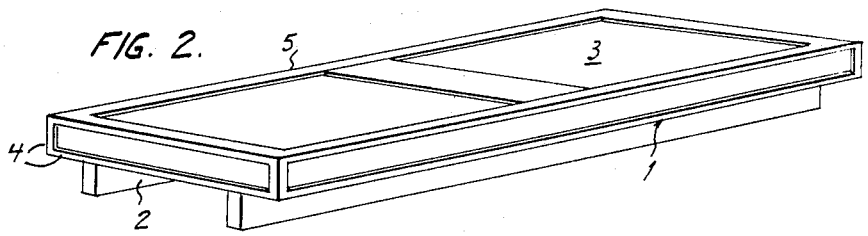
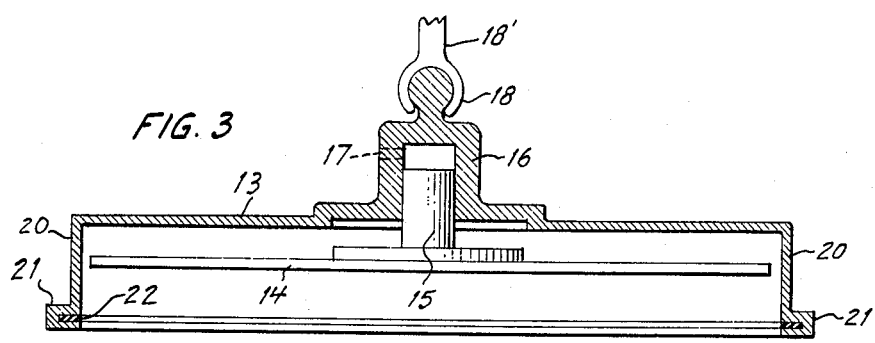
INVENTOR.
GEORGE A. DEAN
BY
ATTORNEYS Dec. 6, 1966   G. A. DEAN   3,289,860
SYSTEM FOR HANDLING STACKED SHEETS
Filed June 9, 1964   4 Sheets-Sheet 2
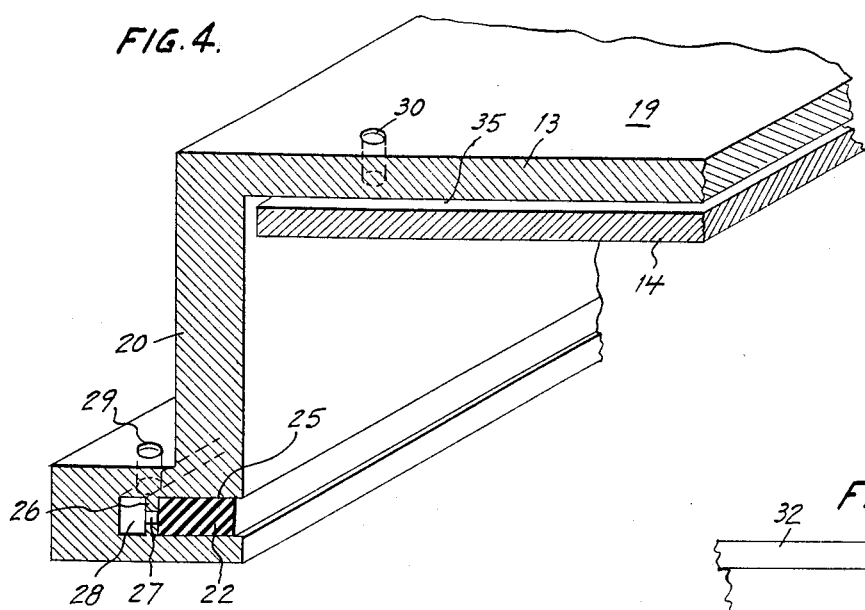
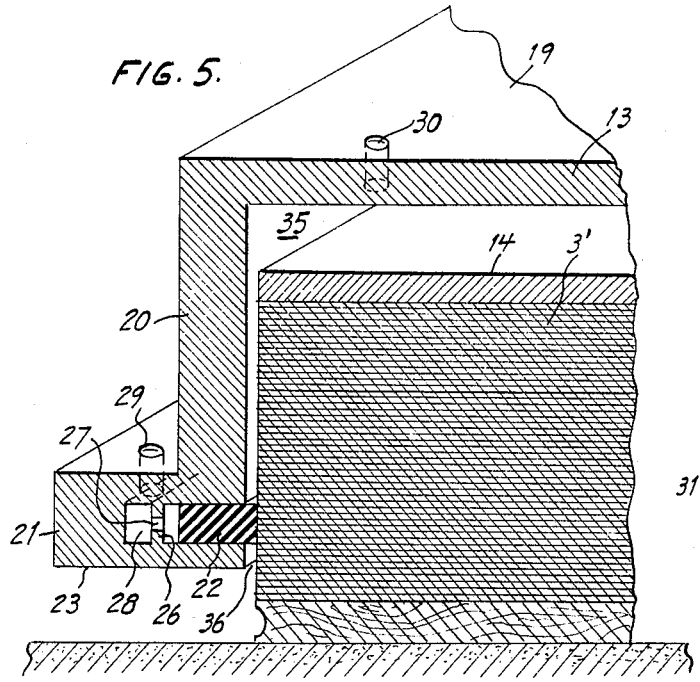
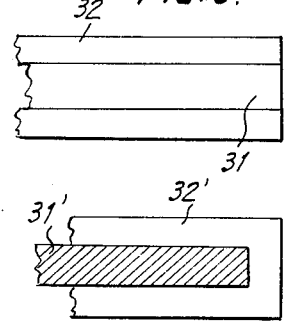
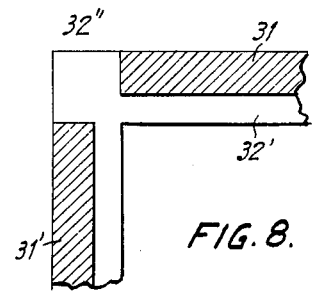
INVENTOR.
GEORGE A. DEAN
BY
ATTORNEYS

INVENTOR.
GEORGE A. DEAN
BY
ATTORNEYS

Dec. 6, 1966  G. A. DEAN  3,289,860
SYSTEM FOR HANDLING STACKED SHEETS
Filed June 9, 1964  4 Sheets-Sheet 4
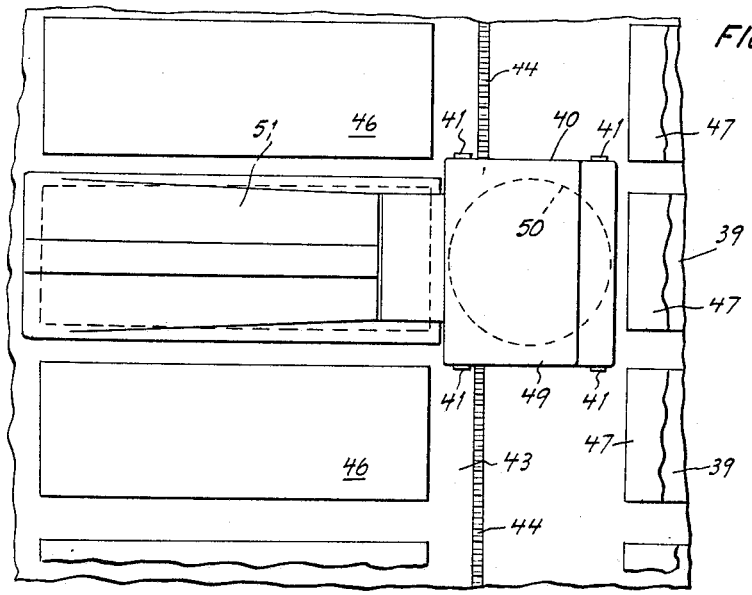
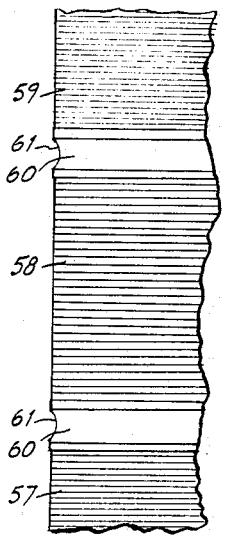
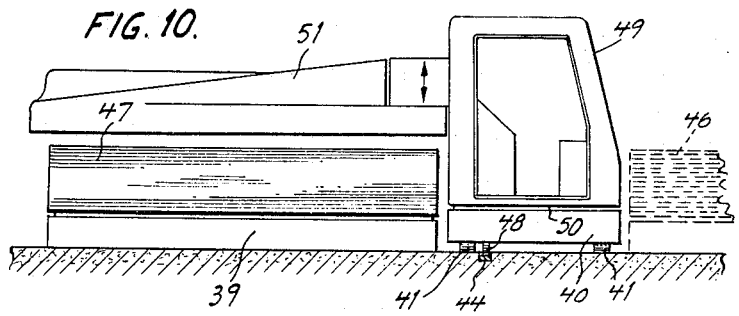
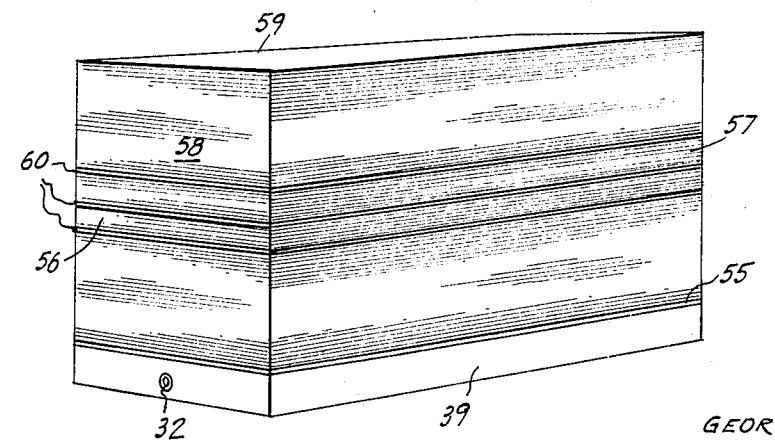
INVENTOR.
GEORGE A. DEAN
BY
ATTORNEYS United States Patent Office 3,289,860
Patented Dec. 6, 1966

3,289,860
SYSTEM FOR HANDLING STACKED SHEETS
George A. Dean, Mission, Kans., assignor to Dean Research Corporation, Kansas City, Mo., a corporation of Missouri
Filed June 9, 1964, Ser. No. 373,800
23 Claims. (Cl. 214—8.5)

The present invention relates to the storage and transportation of sheets of metal, such as aluminum, or other materials in stacks, and more particularly to a convenient method or system for handling the same economically.

In the previous skid system of handling stacked sheets, such as standard 48" x 144" sheets, within a factory area, therewas required extensive storage space and excessive cost of handling individual skids. It involved loss of material from rough handling and repeated transfer of individual sheets. There was also involved the control of inventory and the necessity of automation in material handling systems. In usual practice the sheet material is stacked on skids to an average weight of 4000 pounds. Material may vary in gauge from .020 or less to heavy plate, the height of the stack on the skid being approximately six inches in aluminum to two inches in steel. Top and side rails are nailed to the skid and the complete package steel banded for shipment.

The shipment of sheet material from the mill to the factory warehouse is generally made by truck and is unloaded at the dock with material handling tractors or lifts and hoists. The material in skids is stocked in a designated area by gauge or alloy one skid atop another. The ratio of package volume to volume of actual material ranges from 2 to 1 to 2.5 to 1 depending on the skid design. Normal manufacturing may use twenty different combinations of alloys and gauges of the same sheet size. If each skid is stored by its own category and allowing room for maneuvering between skids approximately 1800 sq. ft. of floor area would be required to handle the total stock. The height of each stack of skids depends on the inventory requirements of the particular sheet material.

The factory must maintain a second stores area matching the warehouse to keep skid handling at a minimum. The skids are not stacked as high however as dictated by the material flow rate through the shop. The warehouse stores major mill shipments while the factory storage area has a turnover proportional to the daily manufacturing schedule.

Within the factory overhead traveling hoists handle the skids from the stock area to the shear. At this point the skid is opened, the material inspected and processed through a particular manufacturing operation. Once a skid is opened the use of the hoist for subsequent handling is impractical and either the entire stack of material on the skid must be used or the remainder returned to another stock area by handling each remaining sheet of the stack. These partial skid sheets are usually stored in partitioned bays and slid into place on the long edge. The empty skids are returned by lift truck or hoist to the shipping area for scrap or salvage.

All this involved considerable difficulties and costs, in view of which it is among the objects of the present invention to provide a master system of stock handling which will eliminate the necessity of multiple handling of sheets and will greatly simplify and render more efficient the factory utilization of sheets.

It is also among the objects of the invention to eliminate the necessity of providing warehouse stores in addition to factory stores and to transport sheets from the mill directly to the factory.

It is further among the objects of the invention to provide means for easily and readily removing any desired portion of a stack and quickly transporting it to the factory area for fabrication.

In practicing the present invention, stacks of sheets from the mill on their skids and provided with side rails and covers and bound by bands are unloaded in the factory or warehouse area. They are stripped of their bands, rails and covers. To transport the stacks there is provided means in the form of a chassis suitably movable and having a transfer head to take up part or all of a stack and move it to other areas. The chassis may either bridge the stack or operate alongside it.

The essential feature of the system is the head which is hollow and has therein a leveling plate with means for adjusting the vertical position therein to determine the number of sheets to be transported. This plate has an important function. The dimensions of the hollow are such as to fit over the sheets. Preferably, the head is mounted so as to be self-adjustable to the attitude of the stack. Means are provided to place a vacuum in the head above the leveling plate, the vacuum providing the force to retain the stack in the head in the operation.

Another important feature of the system is a seal located at the lower end of the head. The seal extends in a continuous body all around the inside of the head. Means are provided in the head to exert hydraulic pressure usually of air, on the outer edges of the seal to cause it to contact the edges of the stack to seal it from the air to allow the vacuum to support the stack and enable the upward movement of the head to lift the stack. This is obtained because of the atmospheric pressure below the seal.

The nature of the system and its mode of operation will become apparent from the following description and in connection with the accompanying drawings constituting a part hereof, in which like reference characters indicate like parts, and in which:

FIG. 1 is a perspective view of the operation of the invention on an aligned set of stacks of sheets on fixed stations.

FIG. 2 is a perspective view of a package of sheets as it arrives from the mill on a skid;

FIG. 3 is a transverse cross-sectional view of the head and the leveling plate which is mounted in a housing;

FIG. 4 is a transverse fragmentary enlarged cross-sectional view of said head in position to be placed on a stack of sheets;

FIG. 5 is a view similar to FIG. 4 in the next step wherein the seal is in the operative position;

FIG. 6 is a fragmentary view of a modified form of seal;

FIG. 7 is a view similar to FIG. 6 showing a further modified form of the seal;

FIG. 8 is a fragmentary top plan view of the seal of the form shown in FIG. 7;

FIG. 10 is a side elevational view showing a unit of the system of FIG. 9;

FIG. 11 is a top plan view of said unit;

FIG. 12 is an elevational view of a stack of several kinds or thicknesses of sheets; and FIG. 13 is an enlarged fragmentary view of a corner of the stack of FIG. 12, showing the separators for the types of sheets.

Figure 9:
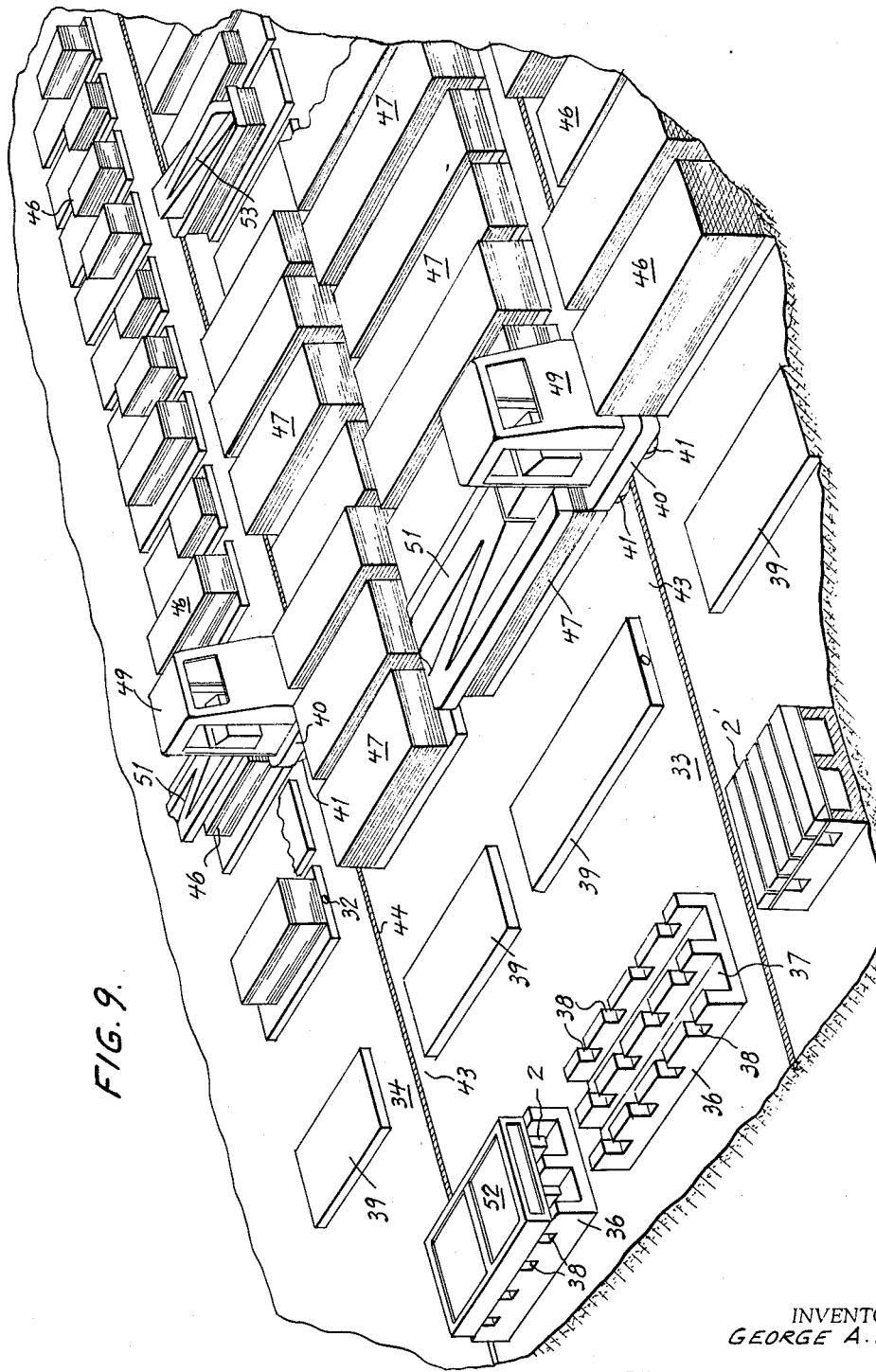
FIG. 9 is a perspective view of a modified system particularly adapted for warehousing of sheets.

Usual skids loaded with sheets are shown in FIG. 2. They consist of a base 1 mounted on runners 2. A stack of sheets, as it comes from the mill, is held on the base. Side rails 4 and crate top 5 are removed. A number of such stacks are placed on stations, such as 6, 7 and 8, which may be either of concrete and stationary, or even movable; the stations being in alignment so that a suitable chassis bridging the stacks may move thereover.

The chassis consists essentially of a pair of spaced legs 9 and 10 with a bridge or housing 11 joining the upper ends of said legs. Wheels 12 on the legs provide means for shifting the chassis along the row of stacks. A head 13 is mounted within the chassis so that it may be moved vertically to adjust the position thereof relative to the sheets.

Within the head is a horizontal leveling plate 14 of a size and shape conforming with the sheets. A vertical actuator or piston 15 extends into cylinder 16 having opening 17 for the application of fluid pressure or vacuum to adjust the vertical position of the leveling plate and thus to limit the number of sheets to be gripped. At the top of head 13 is universal joint 18 which is secured by connection 18' to actuating means for raising or lowering the head. It has depending sides 20 at the lower end of which is a horizontal flange 21. Pickup seal 22 which is horizontally movable to contact the sheets on the stack, is also provided.

Seal 22 is held in slot or slide 25 with its rear end in abutment against stop 26 having a hole 27 communicating with pressure cavity 28, which in turn communicates with pressure port 29 connected to a source of pressure and vacuum. In top 19 of head 13 is the head vacuum port 30 leading to space 35 above the top of plate 14. The chassis is provided with a register 31 which cooperates with complementary registers 32 on each of the bases, being usually of the electric eye type.

In FIGS. 4 and 5, the seal 22 is of solid molded rubber or synthetic material having sufficient elasticity to seal off the sheets from the atmosphere. In FIG. 6 there is shown a modified form of seal in which there is a central core 31 and upper and lower layers 32 of sponge rubber or spongy synthetic material. Another modification is shown in FIGS. 7 and 8 wherein seal 32' is a hollow molded piece having cores or stiffening bars 31' along the four sides thereof. Said bars are short of corners 32" of the seal. This insures a uniform movement all along the seal when it is being moved into operative position.

The operation of the device is as follows:

Referring to FIGS. 1–5, the chassis is aligned through registers 31 and 32, with stack 3' by wheeling it into position. The registers may be of the ball and socket type or of the electric eye type. Leveling plate 14 is adjusted to the desired height above seal 22 by pneumatic means operating in cylinder 16. Head 13 is lowered, preferably by pneumatic means in housing 11, until plate 14 is in contact with the top sheet of stack 3'. It is placed in the same attitude as the stack by action of joint 18–18'. Seal 22, extending all around head 13 is caused to move inwardly by pneumatic pressure applied through port 29, cavity 28 and hold 27 to firmly contact the edge of the sheets and seal the stack off from the atmosphere. A vacuum is applied to port 30 before or after the sealing, sufficient in intensity to create a difference in pressure between space 35 and the outside pressure as at 36, to overbalance the weight of the sheets between plate 14 and seal 22. Due to the difference in pressure, the edge of seal 22 is bent upwardly and inwardly to perfect the seal. Head 13 is then lifted by suitable means, such as a hydraulic cylinder and piston in housing 11, a sufficient amount to clear the rest of the stack. The chassis is then shifted past the end of the row of stacks and put to that part of the factory where the sheets are to be fabricated or stored. The vacuum in space 35 is released causing the sheets to drop into the work area.

In FIG. 9 is shown a system having the essentials of the invention and which is particularly suitable for large installations or for warehousing and the like. Alleys 33 and 34 are provided for the use of the chassis running between stacks. The floor has stations 39 of concrete in alignment on both sides of the aisles. At the entrance end of the system is a row of loading platforms having longitudinal grooves 37 and transverse notches 38, suitably spaced so as to accommodate skids 2' without interfering with the removal of the bands, side rails and covers.

A carriage 40 is mounted on wheels 41 to run in alley 33. Along one side 43 of the alley is a rack 44 flash in the floor. On opposite sides of the alley are stations 39 carrying stacks 46 and 37 of the sheets. The carriage has gears 48 driven by a motor (not shown) mounted in the carriage. A cab or chassis 49 is mounted on turntable 50 operating so as to allow a 360° arc of rotation of cab 49. Head 51 extends laterally from cab 49 and overlays one or the other of the rows of stacks.

The operation is as follows:

A package 52 of sheets from the mill is placed on loading platform 36 and the packing is stripped off. Chassis 40 is run over to platform 36 and picks up the stack placing it on station 39, in reserve, or it may run stack 52 to any other of the stations or out of the storage area. As a number of different sizes of sheets must be stocked, it is convenient to have the head detachable from the cab, as shown at 53 on FIG. 9, the heads being designed for the proper sizes of sheets.

In FIGS. 12 and 13 is shown a modification which is particularly useful for storing small stacks of various types of sheets, with full utilization of each station. On station 39 is a relatively small stack 54 held on pallet 55. Stacks 56–59 of different sheet materials, such as of various alloys or of different thicknesses, are each held on a pallet 60. Each pallet is grooved along its edge 61. This enables seal 22 to enter the groove and completely seal off from the atmosphere.

In addition to the use in factory operations, the present system is of major importance in its application in a sheet material distributor's warehouse. Instead of moving the sheet material from the station to a shear, it is moving material to a packaging area for shipment. In such an operation a multiple of station rows with each car servicing two rows are employed. These rows of stations may be of various sheet sizes and each cab may have four interchangeable heads of different sizes.

The head in use is determined from the size of the sheet material to be handled. The one shown is a 48 x 144 head. If smaller sheets are stacked on another station the operator disengages the head in use and picks up the correct head for handling the smaller sheet. The disengaged head is left on any station of its correct sheet size.

There may be incorporated in the apparatus a computer, such as an electronic device for the purpose of keeping a ready check on the amounts of sheets removed from the stacks by the operations of the apparatus, and delivered to the fabricating section of the factory. The computer will keep track of the weights delivered to the stacks and also the weights removed therefrom.

Many advantages are inherent in the present system. Among them is the storage in a much smaller area than heretofore of more material, and as little as one-fourth of the area. Transfer of stacks is very rapid, being even as much as six times as fast as compared with old methods. Very little vacuum is needed to hold the sheets in the head during transfer; for instance, in the case of 48 x 144 aluminum sheets, one pound of vacuum is ample. The system is simple, is inexpensive, requires practically no maintenance, and can be operated by practically unskilled workmen. Danger of damage to thin sheets during handling is practically eliminated.

Obviously, the sheets which are handled by this invention need not be rectangular. The same invention is readily adaptable to circular, polygonal oval as well as irregular shapes as for example by changing the shape of the head and for making the seal more flexible so as to accommodate irregularities.

In the claims which follow, support is intended to include skids, concrete or other platforms, pallets and/or anything upon which the stacks of sheets rest, including the bare floor.

What is claimed is:

1. A system for handling stacked sheets comprising a support, a stack of sheets thereon, a chassis having a pair of spaced legs and a housing connecting the upper ends of said legs, said chassis adapted to bridge said stack, a vertically movable head in said chassis having rigid depending sides adapted to embrace the upper part of said stack, means for positioning said chassis over said stack, means for lowering said head onto said stack, a seal in the lower inner portion of said depending sides adapted to be moved inwardly to contact at least one of said sheets of said stack, and means in said head for raising at least a portion of said stack from said support for removing said portion.

2. A system according to claim 1 characterized in that said seal is mounted in a slot in said depending sides.

3. A system for handling stacked sheets comprising a support, a stack of sheets thereon, a chassis having a pair of spaced legs and a housing connecting the upper ends of said legs, said chassis adapted to bridge said stack, a vertically movable head in said chassis adapted to embrace the upper part of said stack, means for positioning said chassis over said stack, means for lowering said head onto said stack, means in said head for gripping the side of said stack, and means in said head for raising at least a portion of said stack from said support for removing said portion characterized in that there is a leveling plate mounted in said housing and means for vertically positioning said plate.

4. A system according to claim 1 characterized in that said seal is adapted to be moved by hydraulic means to contact the side of said stack.

5. A system according to claim 4 characterized in that said seal is horizontally movable.

6. A system for handling stacked sheets comprising a support, a stack of sheets thereon, a chassis having a pair of spaced legs and a housing connecting the upper ends of said legs, said chassis adapted to bridge said stack, a vertically movable head in said chassis adapted to embrace the upper part of said stack, means for positioning said chassis over said stack, means for lowering said head onto said stack, means in said head for gripping the side of said stack, and means in said head for raising at least a portion of said stack from said support for removing said portion characterized in that a register on said chassis cooperates with a register on said support to align said head with said stack.

7. A system according to claim 3 characterized in that said positioning means is hydraulically operated.

8. A system according to claim 4 characterized in that said contacting means is hydraulically operated.

9. A system according to claim 1 characterized in that there are a plurality of stacks in alignment and said chassis is adapted to move over said stacks.

10. A system according to claim 1 characterized in that vacuum means is provided in said head for holding said portion of said stack within said head.

11. A method of handling stacked sheets which comprises placing a hollow rigid head over said stack, lowering said head to embrace at least part of said stack, moving a seal from the lower inner portion of said rigid head inwardly a sufficient distance to contact the side of said stack, placing sufficient vacuum in said head to overbalance the weight of said part of said stack, lifting said head, moving said head to a desired station, and releasing said vacuum to drop said stack.

12. A system for handling stacked sheets comprising a support, a stack of sheets thereon, a chassis adjacent to said stack, means for shifting said chassis, a vertically movable head attached to said chassis and having rigid depending sides adapted to embrace at least part of said stack, means for lowering said sides onto said stack, means in said sides adapted to be moved inwardly for sealing against the side of said stack, vacuum means in said head to overcome external air pressure and means in said head for raising at least a portion of said stack.

13. A system according to claim 12 characterized in that said chassis is mounted between two rows of stacks.

14. A system according to claim 12 characterized in that said head is detachable from said chassis.

15. A system according to claim 12 characterized in that there is a rack in said floor and a gear in said chassis cooperating with said gear.

16. A system according to claim 12 characterized in that said head is attached to a carriage, and the latter is mounted on said chassis.

17. A system according to claim 16 characterized in that said carriage is mounted on a turntable.

18. A system according to claim 1 characterized in that said stack rests on a pallet, said seal adapted to contact said pallet.

19. A system according to claim 1 characterized in that said stack rests on a pallet, said seal adapted to contact said pallet, the edges of said pallet being grooved.

20. A system according to claim 1 characterized in that said seal has a sponge face to contact said sheets.

21. A system according to claim 1 characterized in that said seal has a rigid core and a sponge face to contact said sheets.

22. A system according to claim 1 characterized in that said seal has a rigid core and a sponge face to contact said sheets, said core being along the outer edges of said seal.

23. A system according to claim 12 characterized in that a leveling plate within the upper part of said head is movable to vary the distance between said plate and said sealing means.

24. A system according to claim 12 characterized in that a leveling plate within the upper part of said head is movable to vary the distance between said plate and said sealing means and by hydraulic means in said head.

25. A system according to claim 12 characterized in that said head extends laterally from said chassis.

26. A system according to claim 12 characterized in that said head extends laterally from said chassis and being supported only at one end of said chassis.

27. A system according to claim 12 characterized in that said chassis is mounted on a carriage, the latter is mounted on wheels.

28. A system according to claim 26, characterized in that said chassis is mounted on a turntable and is adapted to be rotated so that head may be turned to face in the opposite direction.

References Cited by the Examiner

UNITED STATES PATENTS

| | | | |
|---|---|---|---|
| 2,708,527 | 5/1955 | Wattinger | 214—394 |
| 2,716,497 | 8/1955 | Wahl | 295—65 X |
| 3,040,920 | 6/1962 | Harris | 214—1 X |
| 3,190,473 | 6/1965 | Loef | 214—730 X |

MARVIN A. CHAMPION, *Primary Examiner.*